United States Patent [19]

Tysver

[11] 4,160,305
[45] Jul. 10, 1979

[54] APPARATUS AND METHOD FOR INSERTING A SIZING DISC INTO A TUBULAR CASING

[75] Inventor: Oliver J. Tysver, Flossmoor, Ill.

[73] Assignee: Union Carbide Corporation, New York, N.Y.

[21] Appl. No.: 884,961

[22] Filed: Mar. 9, 1978

[51] Int. Cl.² .................... A22C 7/00; A22C 11/00
[52] U.S. Cl. ........................................... 17/49; 17/33; 17/39; 141/312; 53/258; 426/105; 426/138
[58] Field of Search ................. 426/105, 138; 17/33, 17/35, 34, 41, 49; 53/254, 258; 141/312, 313

[56] References Cited

U.S. PATENT DOCUMENTS

| 3,462,793 | 8/1969 | Sumption | 141/313 X |
| 3,808,638 | 5/1974 | Kupcikevicius et al. | 17/35 |
| 4,028,775 | 6/1977 | Tysver | 17/49 |

Primary Examiner—Willie G. Abercrombie
Attorney, Agent, or Firm—Maurice W. Ryan

[57] ABSTRACT

Apparatus and method for implanting a sizing disc into an open unshirred end of a shirred tubular casing wherein the sizing disc has a larger periphery than the unstretched inner periphery of the unshirred end of the casing.

17 Claims, 12 Drawing Figures

APPARATUS AND METHOD FOR INSERTING A SIZING DISC INTO A TUBULAR CASING

The present invention relates to a method and apparatus for implanting a sizing disc into an unshirred end portion of a shirred tubular casing wherein the sizing disc has a larger external periphery than the unstretched inner periphery of the unshirred end of the casing.

In the meat packing industry, techniques are known for the automatic and semiautomatic filling of various types of casings with viscous meat emulsion. In general, these techniques include positioning a shirred continuous film casing length over a stuffing horn and thereafter continuously deshirring the casing and stuffing and deshirred casing with viscous meat emulsion fed under pressure through the stuffing horn and into the casing interior. As used herein, the term casing or tubular casing is intended to mean tubing of natural or manufactured materials, and the term "casing length" is intended to mean continuous tubular casing lengths. Shirred tubular casings are also known to persons familiar with the art as "sticks", such "sticks" being long lengths of casing having a substantially large bore, which have been shirred and compressed into short compact self-sustaining lengths, or which may be a package of shirred and compressed casing sheathed inside a retaining sleeve. Apparatus and processes are well known in the food casing art for producing shirred tubular cellulosic food casings such as, for example, the apparatus and processes disclosed in U.S. Pat. Nos. 2,983,949 and 2,984,574 to Matecki. These apparatus may be employed in the preparation of pleated and compressed tubular casings wherein the compression ratios (unshirred to shirred stick length) are in the order of at least about 40:1 and up to about 100:1 or even greater. Using suitable food stuffing machinery, casing lengths can be stuffed and formed into unit size links of particulate or comminuted viscous materials, such as meat emulsions, or the like.

In the art of producing sausages and similar food products, the finely divided meat compositions commonly referred to as emulsions, are conventionally stuffed into the tubular casing materials of long length which, as stated above, may be of natural or manufactured materials. Large sausage products used in slicing for multislice package putup are usually made in casings which range in size from the trade designation #6 (101 mm. diameter) to #9 (129 mm. diameter). In the production of large sausage products, a clip closed end casing of precut length is first manually sheathed over the end of a stuffing horn and then stuffed with a food emulsion. The stuffed casing is then tied, twisted or clipped into predetermined unit length cylindrical packages.

The thusly stuffed and encased food emulsion is subsequently cooked and cured according to conventional processes. A large percentage of these large sausage products are thereafter sliced and packaged into units of predetermined weight and slice count for retail sale. The high speed slicing devices employed in such packaging operations are pre-set to yield a specific weight-by-slice count for use in obtaining unit packages of equal weight. Therefore an important aspect of a commercially acceptable large sausage product is that the tubular finished processed sausage product have a substantially uniform diameter from end to end and in successive pieces of the same designated size. Moreover, the diameter of the slices must be uniformly precise in order to assure that the slices will fit into the preformed rigid packaging frequently used.

Since a large sausage casing stuffed with a food emulsion has two generally hemispherical, rounded ends, these rounded ends are generally not used in producing equal weight packages and are either discarded or reworked. Thus another aspect of importance commercially, is to have a large sausage casing stuffed with uniform tight ends, to thereby minimize the amount of food product cut-off from the cylindrical portion.

Years of commercial utilization of manufactured sausage casings such as prepared from unsupported or fibrous reinforced cellulose have provided the experience for determining optimum stuffing and processing conditions for various classes of sausage product. Sausage generally needs to be encased or stuffed to "green" or unprocessed diameters that have been selected and recommended for such optimum performance. The recommended stuffing diameter for each size and type of casing has been established and tabulated in recommended operating procedures determined by the casing manufacturer for guidance of the sausage maker.

When a casing is understuffed from the recommended "green" diameter, the result generally is a processed product that is not uniform in diameter from end to end and from piece to piece; the product is undesirably wrinkled in appearance; and the processed sausage may have an emulsion breakdown yielding undesirable pockets of fat or liquid.

When a casing is overstuffed from the recommended "green" diameter, the casing may split or break apart at the stuffing station or subsequently, in transport to or in the cooking/smoking processing operations. This results in a costly waste of meat and in the labor expense for cleanup.

For many years, the apparatus and methods employed to prepare the encased food products, and particularly food products encased in large diameter casing, have relied upon manual manipulation in controlling the stuffing of food emulsion into predetermined length sausage links or packages. Recently, advances in the art have resulted in the introduction of apparatus for machine control of the stuffing operation which have provided means for preparing uniformly sized encased products such as disclosed, for example, in U.S. Pat. Nos. 2,871,508, 2,999,270, 3,264,679, 3,317,950, 3,454,980, 3,457,588, 3,553,769, 3,621,513, 3,659,317, and 3,751,764.

Although these types of prior art stuffing devices generally provide a fairly wide range of adjustment for producing stuffed casings of desired diameter, the adjustments are usually left to the judgment of the operator, thereby resulting in understuffing or overstuffing caused by deviation from the optimum size recommended by the casing manufacturer. In addition, these prior art devices do not have means for controlling the shape and tightness of stuffing for both the leading and trailing ends of the stuffed casing.

According to U.S. Pat. No. 4,044,426 issued to V. Kupcikevicius and A. L. Mika, on Aug. 30, 1977 there is disclosed an apparatus and method for controlling the uniformity of stuffed diameter and conformation of the terminal ends of a sausage product.

According to the disclosure of said patent there is provided an apparatus and method for stuffing viscous food product into a shirred tubular casing article containing a casing diameter sizing means confined within an unshirred portion of one closed end.

According to U.S. Pat. No. 4,007,761 issued to J. H. Beckman on Feb. 15, 1977 there is provided a prepackaged shirred tubular casing article which can be used on the apparatus disclosed in U.S. Pat. No. 4,044,426 and which is a shirred casing length having an internal bore and having a sizing means confined within an unshirred portion of the casing length. The sizing means generally described as a sizing disc has an outer perimeter larger than the inner perimeter of the unshirred casing length.

The present invention is applicable for implanting the sizing disc into the tubular casing and forming the article disclosed in U.S. Pat. No. 4,007,761.

Devices for stretching or expanding plastic bags to accommodate food items such as sausages, meat loaves, hams and the like are of course well known to those skilled in the art.

Thus according to U.S. Pat. No. 3,503,180, issued Mar. 31, 1970 there is disclosed an apparatus for packaging food items in elastic plastic film bags which apparatus includes means for uniformly expanding and stretching an elastic, memory-type plastic bag about its periphery and along its length so that the food time can be inserted therein.

In U.S. Pat. No. 2,884,328 to Johnson, U.S. Pat. No. 3,181,956 to Clark and U.S. Pat. No. 3,252,267, to Myles there is disclosed apparatus which utilize two pairs of fingers to stretch and expand an elastic bag about its periphery.

When such bagging apparatus as described above is adapted for inserting a sizing disc into a casing, wherein the sizing disc has a greater external periphery than the inflated inner periphery of the casing, it has been found that such apparatus requires exertion of a very large stretching force and tends to cause casing damage or breakage since the film of a casing does not have the high degree of elasticity of a plastic film. This breakage is also due in part to the fact that such prior art devices do not, in fact, permit the uniform contacting and only local stretching of casing that surrounds the disc as the disc is inserted in the casing.

More recently, U.S. Pat. No. 4,028,775 issued to O. J. Tysver on June 14, 1977 discloses an apparatus for inserting a sizing disc into a tubular casing which alleviated most of the disadvantages indicated above. The present invention provides an apparatus which is less complex than that disclosed in U.S. Pat. No. 4,028,775.

It is an object of the present invention, therefore, to provide an apparatus and method for implanting a sizing disc into an unshirred end portion of a shirred tubular casing wherein the sizing disc has a larger external periphery than the unstretched inner periphery of the unshirred casing.

Another object of the present invention is to provide an apparatus for implanting a sizing disc into an unshirred end portion of a shirred tubular casing which apparatus is easy to operate, and presents fewer operating difficulties than some prior art devices.

These and other objects will become apparent when considered in the light of the following description taken in conjunction with accompanying drawing in which:

Broadly contemplated, the present invention provides an apparatus for inserting a sizing disc into an unshirred end of a shirred tubular casing stick wherein the sizing disc has a larger periphery than the unstretched inner periphery of the unshirred end of said tubular casing which comprises in combination a frame, disc storage means and disc dispensing means positioned on said frame, securing means associated with said dispensing means adapted to detachably secure an unshirred end portion of a shirred tubular casing stick to said dispensing means, disc advancing means communicating with said dispensing means for advancing said sizing disc disposed in planar relation to said dispensing means in a direction substantially parallel to the longitudinal axis of said dispensing means and said unshirred portion of said tubular casing and into said unshirred end of said tubular casing, and disc rotating means for rotating said disc in said unshirred portion in a vertical direction along the longitudinal axis of said tubular casing.

Advantageously, the apparatus can include conventional casing gathering, clip applying and cut-off means to provide a finished shirred tubular casing article having the sizing disc appropriately positioned within an unshirred portion of the tubular casing article.

The present invention also provides a method for inserting a sizing disc into an unshirred end of a shirred tubular casing stick wherein the sizing disc has a larger periphery than the unstretched inner periphery of the unshirred end of said tubular casing which comprises, unshirring an open end portion of a shirred casing length, positioning said unshirred end around an exit conduit of a sizing disc dispenser, securing said unshirred open end portion of casing length to said exit conduit, inserting said sizing disc into said unshirred end portion such that the plane of the disc is parallel to the central longitudinal axis of said unshirred casing, rotating said disc through about 90°, while advancing it through said unshirred casing end portion, stretching locally said unshirred casing through said simultaneous rotation and advancement of said sizing disc, continuing the advancement of said disc into said open end of said casing, positioning said disc a predetermined distance from the shirred portion of said casing length with the center of said disc coincident with the center of said unshirred casing and with said unshirred casing stretched about said disc and thereafter releasing said secured portion of said unshirred article from said exit conduit.

A shirred tubular casing article can be produced from the above method by gathering the unshirred casing end portion centrally to compact the casing wall, applying a closure to the compacted casing wall, and thereafter severing the casing.

As mentioned previously, the present invention is applicable for implanting a sizing disc into the tubular casing and forming the article disclosed in U.S. Pat. No. 4,007,761. As indicated in the above patent, the sizing disc has an outside diameter predetermined to provide optimum food product stuffing performance when used with a flexible shirred casing of consonant diameter. This requires matching the casing with a sizing disc having a diameter slightly larger than the inside diameter. For optimum performance in stuffing the shirred tubular casing article with meat emulsion, it is preferred to use a casing having a moisture content greater than 20%.

The sizing disc which can be employed in the present invention can be of a generally annular configuration and is provided with a central opening for mounting the disc onto a stuffing apparatus. The sizing disc can be fabricated from any material capable of withstanding the stresses imposed upon it during operation. Merely as illustrative, the sizing disc can be fabricated from a metal such as stainless steel or a plastic such as polyethylene, nylon, polytetrafluoroethylene, and like materials. A preferred type of sizing disc for use in the present invention is disclosed in U.S. Pat. No. 4,034,441.

Figure 1:
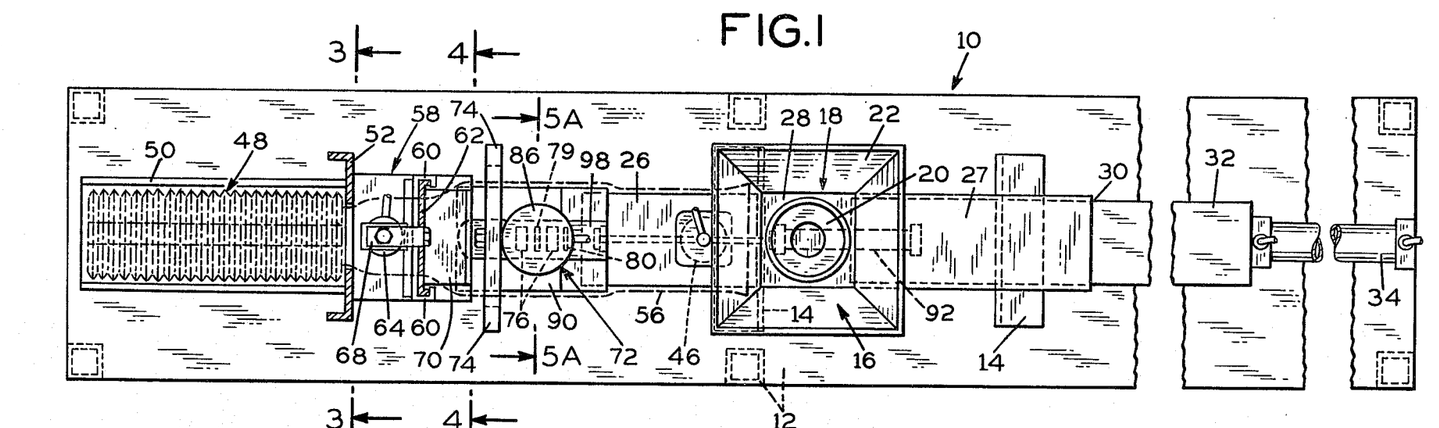
FIG. 1 is a plan view of the apparatus of the invention.
Figure 2:
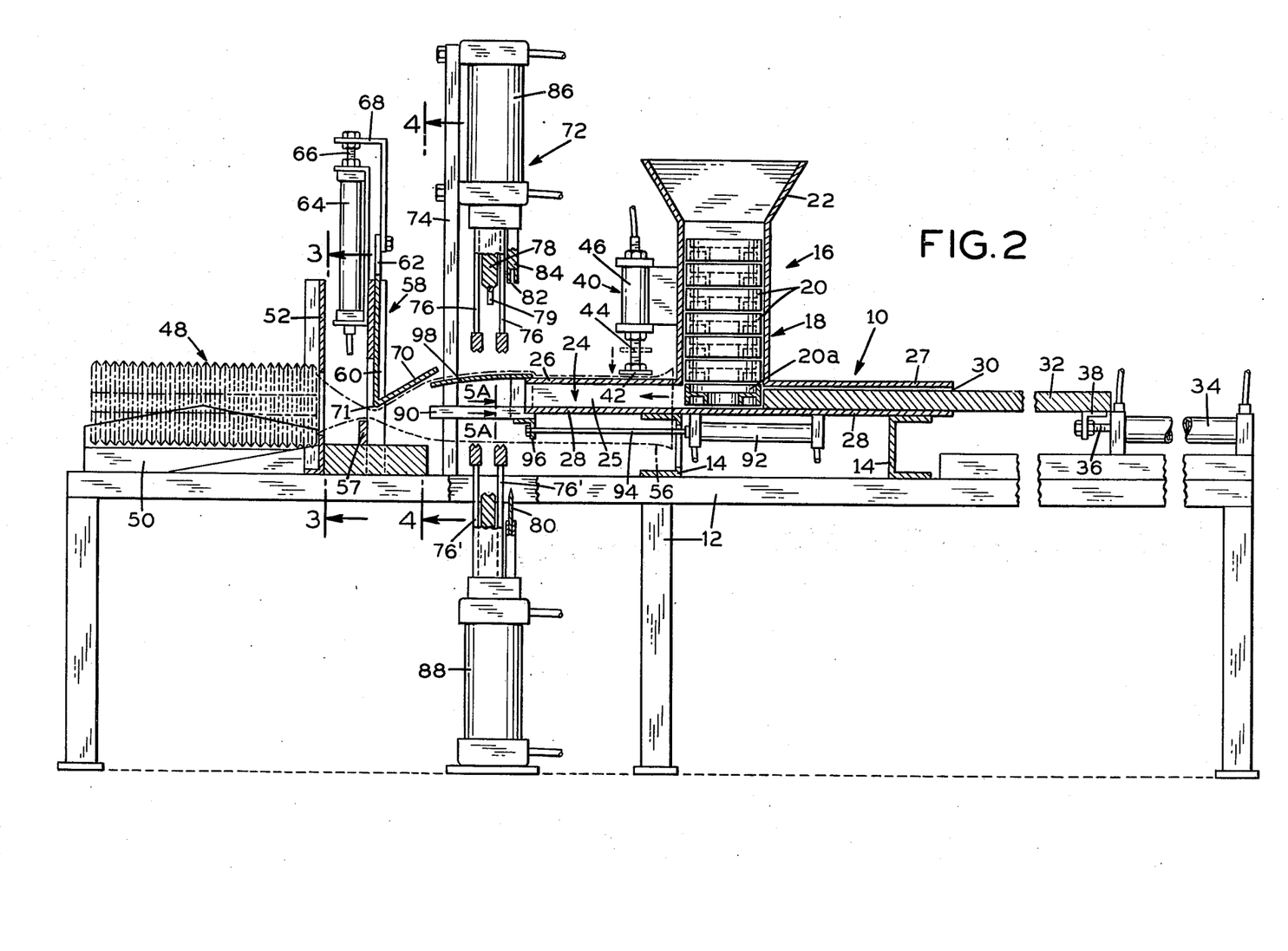
FIG. 2 is a side elevational view, partly in section, of the apparatus of FIG. 1 with parts broken away for a better showing.
Figure 3:
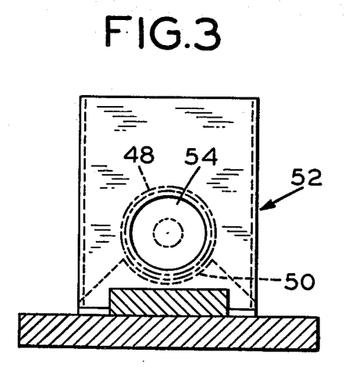
FIG. 3 is a vertical section taken along the line 3—3 of FIGS. 1 and 2.

Referring to the drawing and specifically to FIGS. 1 and 2, reference numeral 10 generally denotes the apparatus of the invention which is provided with a frame 12 of sufficient strength to support the various elements constituting the apparatus. Rigidly, positioned on frame 12 by supports 14 are disc storage and dispensing means 16 which as illustrated in FIGS. 1 and 2 extends upwardly from frame 12. The particular storage and dispensing means illustrated has a main body portion 18 having a configuration adapted to accommodate and store a series of vertically stacked sizing discs 20 in the main body portion 18. The upper portion of the body portion 18 has outwardly flaring sides 22 whereby loading of the sizing discs into the body portion is facilitated. The lowermost sizing disc 20a is in alignment with exit conduit 24, shown in FIG. 5A as a closed rectangular structure, projecting from the main body portion 18, and formed by upper base plate 26 and lower base plate 28. Upper base plate 26 and lower base plate 28 are connected by side plates 25. A movable extension 90 envelopes exit conduit 24, and serves to selectively extend lower base 28 at the exit conduit 24. Also, attached to the upper portion of movable extension 90 is a spring hold-down finger 98. Extension 90, together with the attached spring hold-down finger, is actuated by a conventional pneumatic cylinder 92, having a piston 94 which is connected to extension 90 by bracket 96. Lower base plate 28 is disposed substantially longitudinally parallel to the frame 12, and together with upper plate 27 and side plates 25, also forms conduit 30, communicating with exit conduit 24, and which is adapted to slideably accommodate pusher element 32, which prior to activation is disposed in conduit 30 adjacent the lowermost sizing disc 20a. Pusher element 32 is designed to be substantially equal in thickness to the thickness of the sizing disc. As best seen in FIG. 2, the lowermost sizing disc is positioned adjacent pusher element 32, and the sizing disc is ready to be advanced into and through exit conduit 24, which has its lower base 28 and spring hold-down finger 98 in the extended condition by means of the forward position of extension 90. Advancement of the sizing disc is effected by pusher element 32, which is activated by means of a conventional pneumatic cylinder 34 having a piston 36 secured to pusher element 32 by bracket 38. Associated with disc storage and dispensing means 16 is a clamping device 40 having a clamping member 42 at the terminal end of piston 44 and which is urged either toward or away from upper base plate 26 by means of pneumatic cylinder 46 which is also activated by conventional means. The function of the clamping device 40 is to secure the unshirred portion of a shirred tubular casing during insertion of a sizing disc. Thus referring again to FIGS. 1 and 2, it will be seen that the apparatus of the present invention is adapted to accommodate a shirred tubular casing stick 48 by means of holding trough 50 rigidly positioned on frame 12. The shirred tubular casing stick 48 is restrained from forward motion by means of reaction plate 52. As best seen in FIG. 3, reaction plate 52 is provided with an opening 54 through which the unshirred end 56 of the shirred tubular casing is passed and is ultimately sheathed around extension 90 and upper base plate 26 and lower base plate 28 in a manner such that the lowermost sizing disc 20a can be advanced into the unshirred portion by activation of pusher element 32. As the sizing disc is urged through extended exit conduit 24 by means of pusher element 32, it traverses a path wherein the plane of the sizing disc is substantially parallel to the longitudinal axis of the shirred tubular casing.

Figure 5:
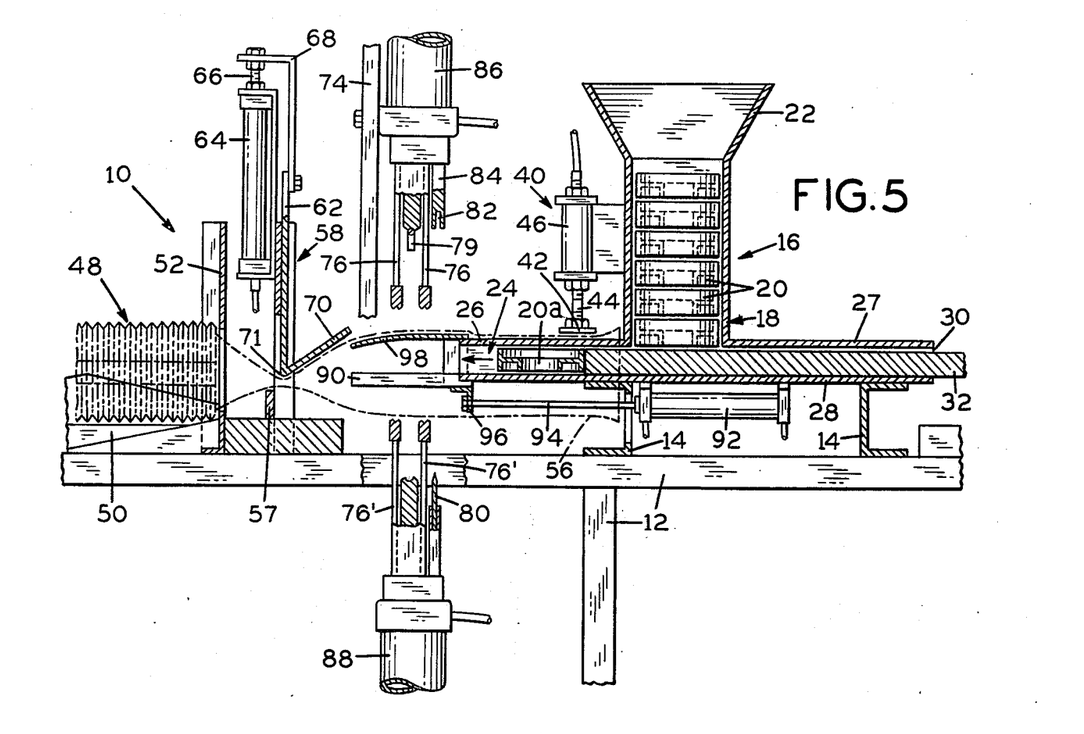
FIG. 5 shows the sizing disc further advanced within the unshirred portion of the casing.
Figure 5A:
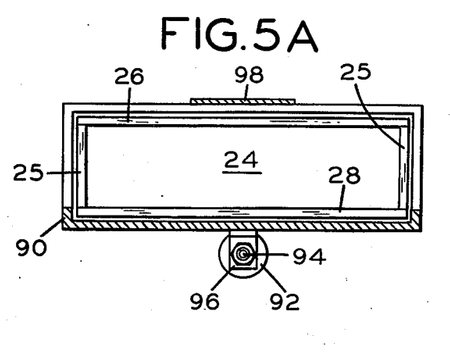
FIG. 5A is a vertical section taken along the line 5A—5A of FIGS. 1 and 2.
Figure 6:
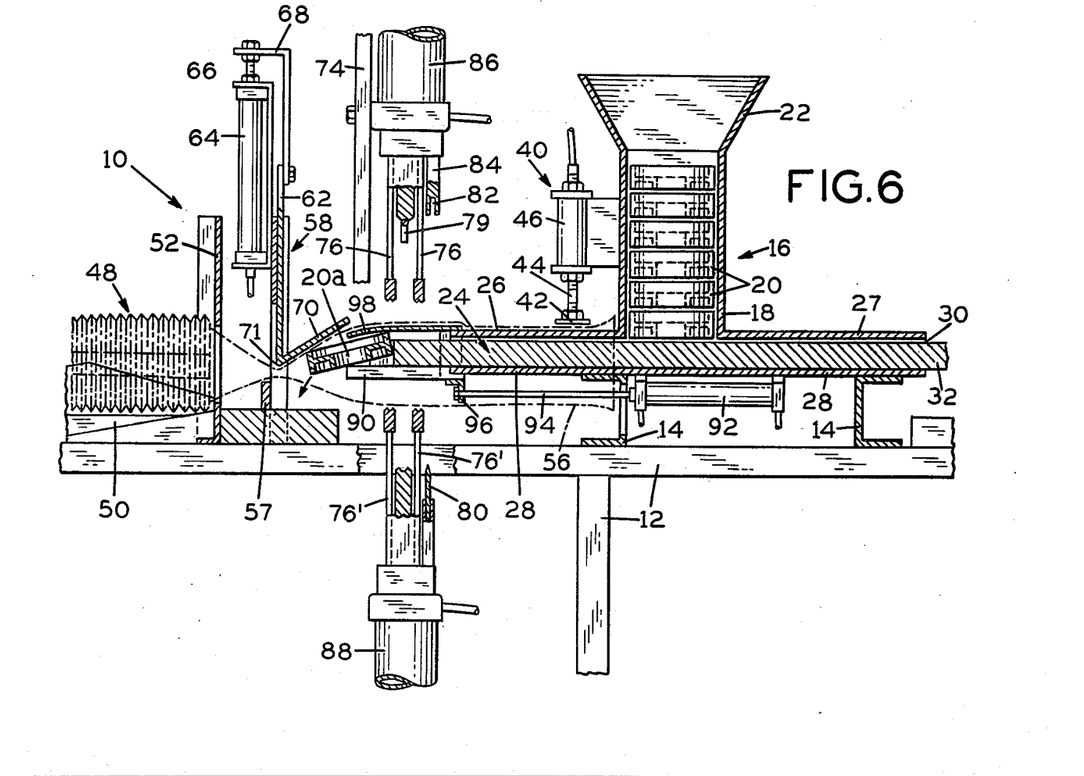
FIG. 6 is a view similar to FIG. 5 showing the disc being further advanced into a slightly tilted position.
Figure 7:
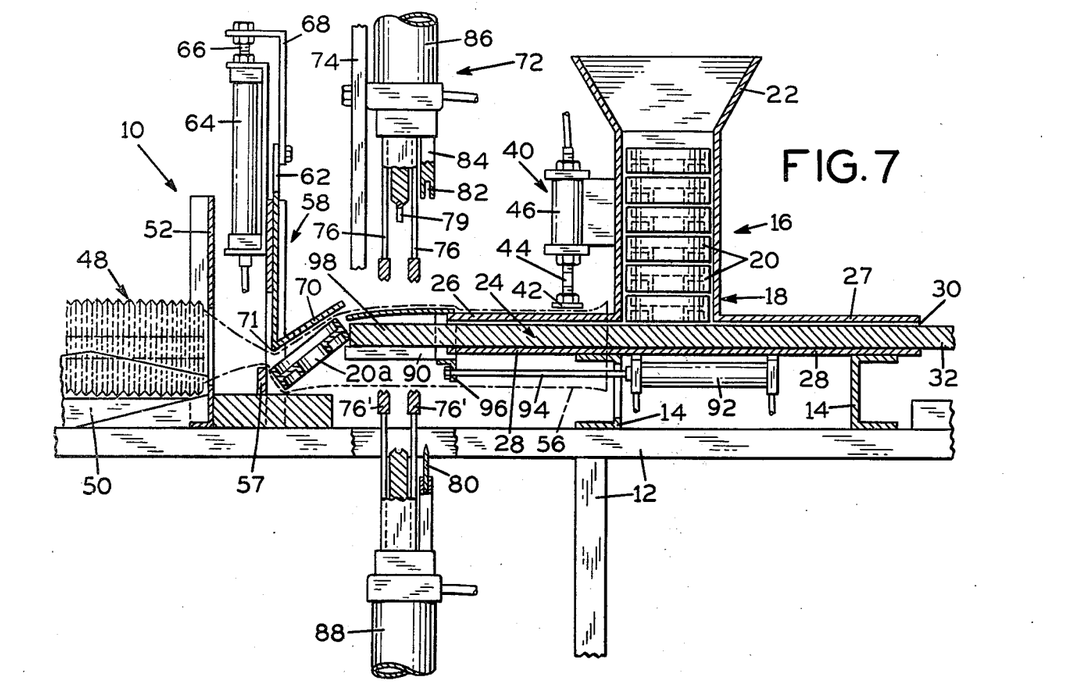
FIG. 7 is a view similar to FIG. 5 with the disc advanced still further towards a vertical position and towards the deflecting plate.

As the lowermost sizing disc 20a is advanced along exit conduit 24 as shown in FIGS. 5 and 6, the unshirred end 56 of casing stick 48 is firmly held against the upper base plate 26. As the pusher element 32 urges the sizing disc forward, spring hold-down finger 98 provides a downward restraining force on the disc. The sizing disc passes the end of extension 90 of the lower base plate 28 and begins to tilt downward at the unsupported portion of the disc as shown in FIG. 6. The longitudinal centerline of the pusher element 32 is above the longitudinal centerline of the shirred tubular casing stick 48 and the force of the advancing pusher element therefore causes the disc to rotate in a counter-clockwise direction as shown in FIG. 7. Spring hold-down finger 98 provides a control during this rotation.

Figure 4:
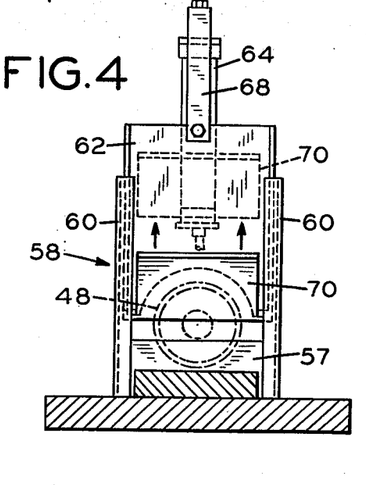
FIG. 4 is a vertical section taken along the line 4—4 of FIGS. 1 and 2.
Figure 4A:
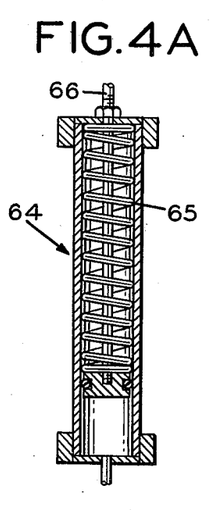
FIG. 4A is a sectional view of a pneumatic/mechanical cylinder.

The partial rotation of the sizing disc effected by gravitational forces tilting the sizing disc as previously explained, is not sufficient for the final proper placement of the sizing disc within the shirred tubular casing. Consequently, the apparatus includes disc rotating means 58 which is positioned proximate reaction plate 52 and is disposed between exit conduit 24 and reaction plate 52. The disc rotating means 58 generally includes supports 60 anchored to frame 12, with sliding oblique plate (or deflection plate) 62 vertically movably mounted thereon, and pneumatic cylinder 64 which provides vertical displacement of oblique plate 62. A disc stopping means 57 is located between reaction plate 52 and disc rotating means 58. Referring to FIGS. 1, 2 and 4, oblique plate 62 is secured at its upper portion to the piston end 66 of pneumatic cylinder 64 through bracket 68 in a manner such that movement of the piston end 66 causes corresponding vertical displacement of oblique plate 62. Pneumatic cylinder 64 is specially constructed, although commercially available, as shown in FIG. 4A. A soft spring 65 is incorporated within cylinder 64 such that oblique plate 62 is spring loaded when it is in the "down" position depicted in FIG. 2. Air is applied to the cylinder 64 only to raise oblique plate 62 out of the way when loading or unloading a shirred tubular casing stick 48. When the air is released, the spring force moves the oblique plate to the "down" position shown.

As best seen from FIG. 2, oblique plate 62 has an angularly disposed portion 70 extending from the lower end 71 or apex of oblique plate 62. The portion 70 is angularly disposed so that when the pusher element urges the sizing disc against oblique plate 62, it will coact with the portion 70 of oblique plate 62 to further provide the desired rotation of the sizing disc. During this rotation, it will be seen from FIG. 6 that control is obtained by three-point contact of the sizing disc with the pusher element 32, the spring hold-down finger 98, and portion 70 of oblique plate 62. As the rotation of the sizing disc progresses, FIG. 7 shows that the disc maintains contact with portion 70 of oblique plate 62 and the pusher element 32, but the third point of contact is transferred from the spring hold-down finger 98 to disc stopping means 57. FIG. 7 also clearly shows that a portion of the casing wall is restrained between the rotating disc and protion 70 of oblique plate 62.

Figure 8:
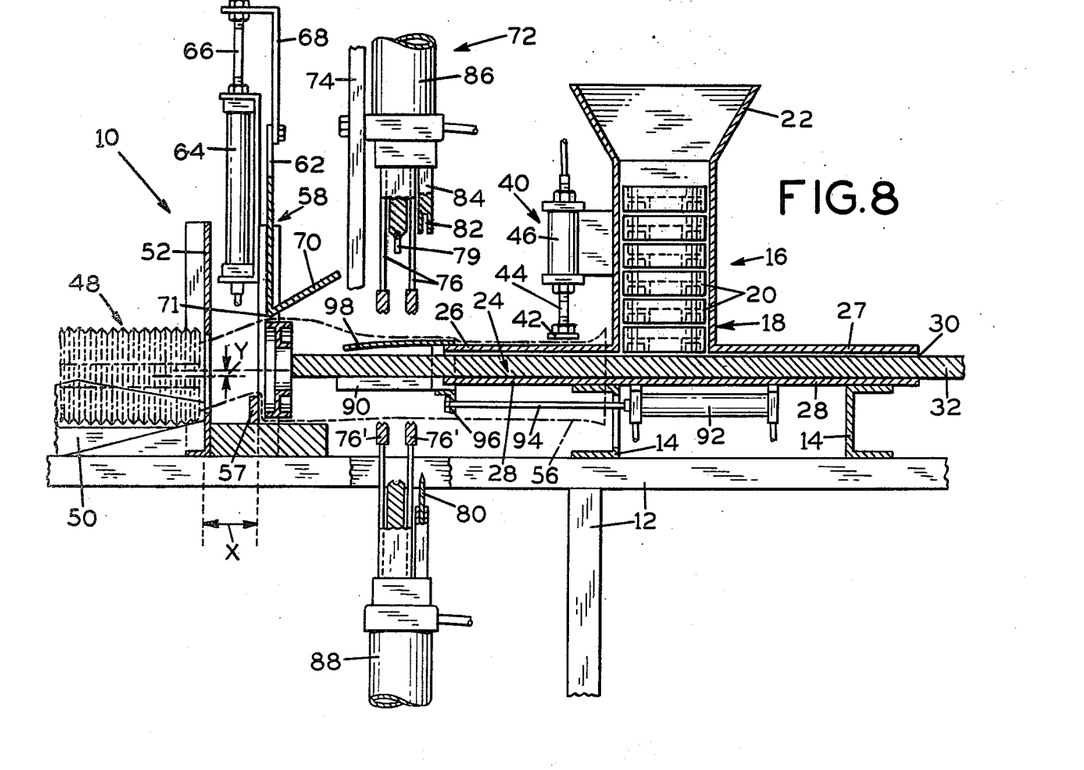
FIG. 8 shows the sizing disc in a full vertical position, the deflecting plate having been raised in an out of use position.

As the pusher element 32 continues its advance, the oblique plate 62 is eased upward against the force of the soft spring 65 in cylinder 64. Coaction with the oblique plate 62 and disc stopping means 57, together with the action of the moment arm created by the slight offset distance "Y" between the pusher element and the centerline of the casing, serve to effect the full 90° rotation of the sizing disc. Referring to FIG. 8, which shows the pusher element 32 in its maximum extended position, it will be seen that the apex 72 of the oblique plate 62 rests on top of the sizing disc, separated from the sizing disc by the casing wall. The sizing disc is thus finally implanted within the casing a desired distance "X" from the end of the shirred casing, positioned by disc stopping means 57. The unshirred portion of the casing is stretched uniformly about the periphery of the sizing disc.

A finished shirred tubular casing article such as disclosed in U.S. Pat. No. 4,044,426 can be produced according to the apparatus of the present invention by including conventional, commercially available clip applying and cut-off means. Merely as illustrative, an appropriate casing gathering, clip applying and cut-off device is available from the Tipper Tie Division of City Investing Company. In the drawing, a representative type is illustrated and is disposed between disc rotating means 58 and exit conduit 24. Thus referring again to FIGS. 1 and 2, a casing gathering, clip applying, cut-off device generally illustrated by reference numeral 72, is disposed between conduit 24 and reaction plate 52. The device 72 can be rigidly positioned by any convenient means such as by securing the device to the frame 12 by struts 74. The device 72 includes an oppositely disposed pair of casing gathering elements 76 and 76' and a clip closing device 78 accommodating a clip 79. A severing knife 80, for severing the clip closed product is adapted to be advanced into slot 82 of annular ring 84. Movement of the elements, i.e., severing knife 80, the gathering elements 76 and 76' and the clip closing device 78 is sequentially timed by means of control elements (not shown) activating pneumatic cylinders 86 and 88 to which these elements are connected. Casing gathering, clip closing, and cut-off means 72 is permitted to function when extension 90 is withdrawn by pneumatic cylinder 92 (after retraction of pusher element 32 to its initial position). The oblique plate 62 is raised to its full retracted position pneumatically, after the casing gathering, clip closing, and cut-off operations, allowing easy removal of the finished article.

In a typical mode of operation with reference to the drawing, extension 90 is extended to its full length by activation of pneumatic cylinder 92. Prior to startup, oblique plate 62 is in a raised position as a result of activation of pneumatic cylinder 64. A shirred tubular casing stick 48 is positioned in holding trough 50 and an unshirred end 56 is passed through the opening 54 of reaction plate 52, in between supports 60, and is sheathed around extension 90 and upper base plate 26 and lower base plate 28. Clamping device 40 is inactivated, and the clamping member 42 is in its uppermost position as shown by the dotted lines in FIG. 2. The casing gathering, clip closing, and cut-off device 72 is inactivated, and in the position shown in FIG. 2. The pusher element 32 is in its most rearward position and is disposed adjacent the lowermost sizing disc 20a ready to be advanced through exit conduit 24 and into the unshirred end of the tubular casing. Upon startup, pneumatic cylinder 46 is energized, and clamping member 42 is urged against upper base plate 26 so that the unshirred end of the tubular casing is securely held against the upper base plate 26. Air is released from pneumatic cylinder 64, allowing the spring force to lower oblique plate 62 to the position shown in FIG. 2 of the drawing. Pneumatic cylinder 34 is energized, and causes the pusher element 32 to advance towards the shirred tubular casing carrying with it the lowermost sizing disc 20a through exit conduit 24 as shown in FIG. 5 of the drawing.

As shown in FIG. 6, the advancing pusher element urges the sizing disc 20a past the terminal end of extension 90. Aided by a gravitational force, with three-point contact (control) maintained by the pusher element 32, portion 70 of oblique plate 62, and spring hold-down finger 98, a partial rotation of the disc in the desired direction is achieved. The pusher element 32 continues its advance, the disc maintaining contact with portion 70 of oblique plate 62, while the third point of contact is transferred from the spring hold-down finger 98 to the disc stopping means 57. Further longitudinal advancement of the disc is restrained by disc stopping means 57.

Figure 9:
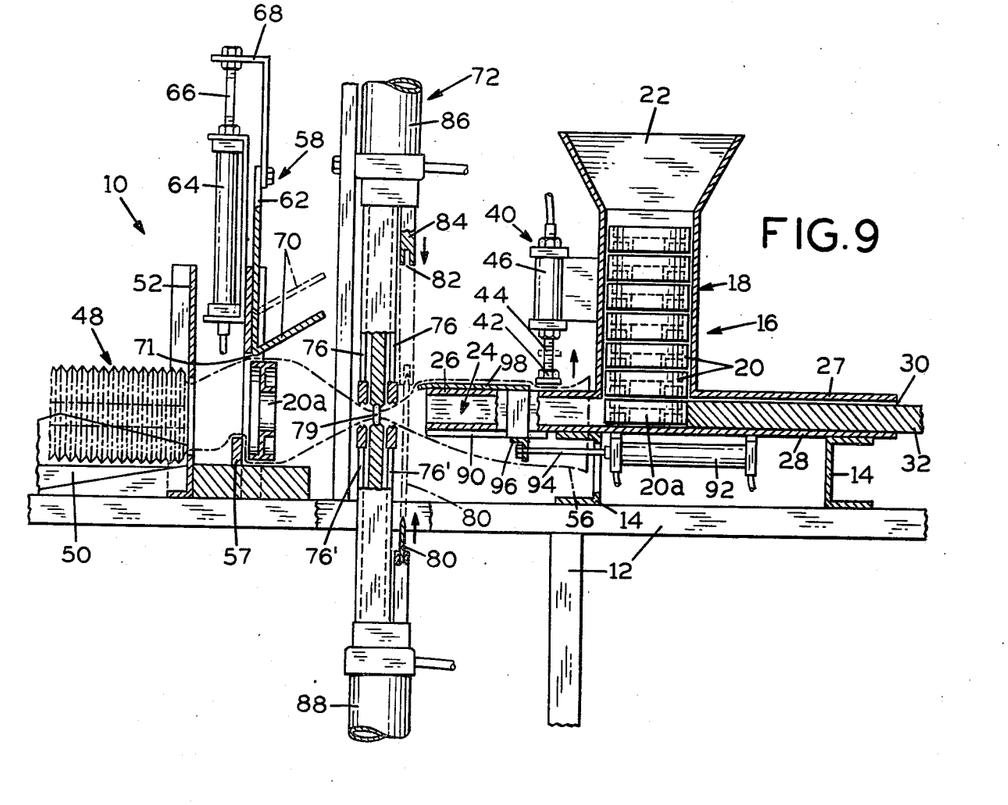
FIG. 9 shows the end portion of the casing being tightly clasped, and a clip being applied to the gathered casing.
Figure 10:
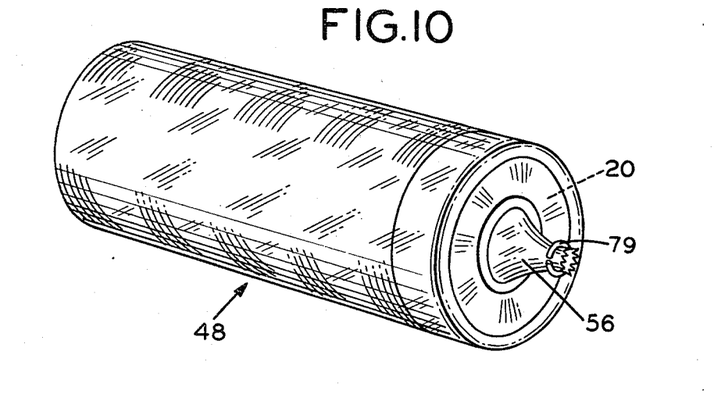
FIG. 10 is a perspective drawing of a complete tubular article.

As shown in FIG. 7, at this point a portion of the casing wall is restrained between the disc and portion 70 of oblique plate 62. The pusher element 32 continues its rotation of the sizing disc. Said rotation is accomplished as the sizing disc urges the oblique plate 62 upward against the action of the soft spring in cylinder 64, and is aided by the fact that the centerline of the pusher element 32 is slightly above the centerline of the casing (by the distance "Y"). The insertion of the sizing disc is completed, as shown in FIG. 8, with the sizing disc 20a implanted within the casing a desired distance "X" from the end of the shirred casing stick 48. The final longitudinal position of the disc is determined by disc stopping means 57. The unshirred portion of the casing is at this point stretched uniformly about the periphery of the sizing disc and the centerline of the sizing disc is substantially coincident with the centerline of the casing. After the sizing disc has been implanted into the unshirred portion of the tubular casing stick, pneumatic cylinder 34 is energized, thereby retracting pusher element 32 rearwardly to the position shown in FIG. 9. Pneumatic cylinder 92 is also energized to retract extension 90. The casing gathering clip and cut-off device is activated through pneumatic cylinders 86 and 88, and the casing is gathered by gathering elements 76 and 76' and a clip 79 is applied to the gathered portions as shown in FIG. 9. After the clip has been applied, the casing is severed by severing knife 80. At the completion of the severing of the casing, an article, as illustrated in FIG. 10, is produced. Pneumatic cylinder 64 is then activated, which raises oblique plate 62 to its loading/unloading position (shown in phantom in FIG. 9), allowing easy removal of the finished article. A new shirred tubular casing stick 48 is positioned in trough 50, and a new sizing disc is then gravity fed for entry into conduit 24, and is disposed adjacent pusher element 32 to repeat the cycle. For purposes of simplicity, the sources of the fluid supply for activating the various pneumatic and pneumatic/mechanical cylinders have not been shown. These cylinders are conventional in the art. Moreover, the sequence of operation of the various components of the apparatus are affected by utilization of conventional time switches, time delay valves, etc.

Alternative embodiments and modes of practicing the invention, but within its spirit and scope, will, in the light of this disclosure, occur to persons skilled in the art. It is intended, therefore, that this description be taken as illustrative only and not be construed in any limiting sense.

What is claimed is:

1. An apparatus suitable for inserting a sizing disc into an unshirred end of a shirred tubular casing wherein the sizing disc has a larger periphery than the unstretched inner periphery of the unshirred end of said tubular casing which comprises in combination a frame, disc storage means and disc dispensing means positioned on said frame, securing means associated with said dispensing means adapted to detachably secure an unshirred end portion of a shirred tubular casing to said dispensing means, disc advancing means communicating with said dispensing means for advancing said sizing disc disposed in planar relation to said dispensing means in a direction substantially parallel to the longitudinal axis of said dispensing means and said unshirred portion of said tubular casing and into said unshirred end of said tubular casing, and disc rotating means for rotating said disc in said unshirred portion in a direction perpendicular to the longitudinal axis of said tubular casing.

2. An apparatus according to claim 1 wherein said disc dispensing means include a disc exit conduit and an inlet conduit in longitudinal alignment with said disc advancing means, and wherein said unshirred end portion of said tubular casing is sheathed around said exit conduit.

3. Apparatus according to claim 2 wherein said disc advancing means includes a pusher element adapted to be advanced and retracted along said disc exit conduit and being further adapted to urge a sizing disc into said unshirred portion sheathed around said exit conduit.

4. Apparatus according to claim 1 wherein said securing means is a clamping device having a clamping member adapted to be urged either away from or toward said unshirred end portion of said shirred tubular casing secured to said dispensing means.

5. Apparatus according to claim 1 wherein said disc rotating means include supports anchored to said frame and a sliding plate vertically movably mounted on said supports.

6. Apparatus according to claim 5 wherein said sliding plate has a main portion vertically disposed with respect to said pusher element and a lower end portion extending from said main portion which is angularly disposed with respect to said pusher element.

7. Apparatus according to claim 1 further including limit means which limit the movement of said shirred tubular casing toward said dispensing means.

8. Apparatus according to claim 7 wherein said limit means include a reaction plate positioned on said frame in juxtaposed position to said shirred tubular casing, said plate defining an annulus defining an opening through which said unshirred portion of said tubular casing is passed.

9. Apparatus according to claim 1 further including casing gathering means, clip means and severing means.

10. Apparatus according to claim 1 further including limit means which limits the movement of said sizing disc toward said shirred tubular casing.

11. Apparatus according to claim 1 wherein said disc rotating means includes a disc hold-down means.

12. A method for inserting a sizing disc into an unshirred end portion of a shirred tubular casing wherein the sizing disc has a larger periphery than the unstretched inner periphery of the unshirred end of said tubular casing which comprises, unshirring an open end portion of a shirred casing length, positioning at least a part of said unshirred open end portion of casing length around an exit of a sizing disc dispenser, securing said unshirred open end portion of casing length to said exit, inserting a sizing disc into said unshirred end portion such that the plane of the disc is parallel to the central longitudinal axis of said secured unshirred casing, rotating said disc through about 90° while advancing it through said unshirred casing end portion, stretching locally said unshirred casing through said simultaneous rotation and advancement of said sizing disc, continuing the advancement of said disc into said unshirred open end portion of said casing and positioning said disc a predetermined distance from the shirred portion of said casing length with the center of said disc coincident with the center of said unshirred casing and with said unshirred casing stretched about said disc, and thereafter releasing said secured portion of said unshirred casing from said exit.

13. A method according to claim 12 further including gathered the unshirred casing end portion centrally to enclose said sizing disc within the unshirred casing and to compact the gathered casing wall, and applying a closure to the compacted casing wall.

14. A method according to claim 13 further including the step of severing an unshirred portion of casing which does not confine the sizing disc and which is not compacted and secured by said closure.

15. A method for inserting a sizing disc into an unshirred end portion of a shirred tubular casing which comprises, unshirring an open end portion of a shirred casing length, positioning at least a part of said unshirred open end portion of casing length around an exit of a sizing disc dispenser, securing said unshirred open end portion of casing length to said exit, inserting a sizing disc into said unshirred end portion such that the plane of the disc is parallel to the central longitudinal axis of said secured unshirred casing, rotating said disc through about 90° while advancing it through said unshirred casing end portion, continuing the advancement of said disc into said unshirred open end portion of said casing and positioning said disc a predetermined distance from the shirred portion of said casing length with the center of said disc coincident with the center of said unshirred casing, and thereafter releasing said secured portion of said unshirred casing from said exit.

16. A method according to claim 15 further including gathering the unshirred casing end portion centrally to enclose said sizing disc within the unshirred casing and to compact the gathered casing wall, and applying a closure to the compacted casing wall.

17. A method according to claim 16 further including the step of severing an unshirred portion of casing which does not confine the sizing disc and which is not compacted and secured by said closure.

* * * * *